United States Patent Office 2,715,712
Patented Aug. 16, 1955

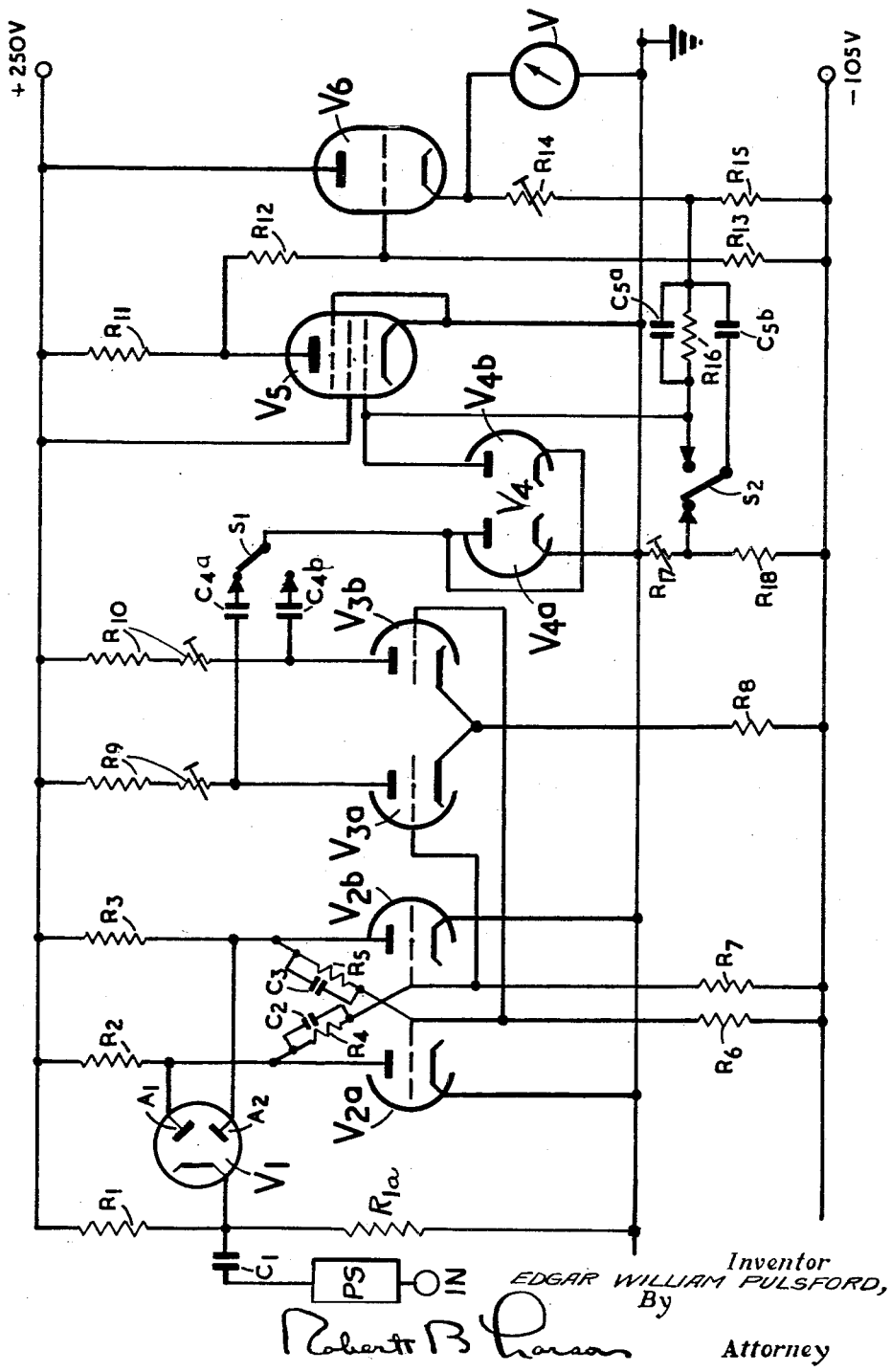

2,715,712

INTEGRATING CIRCUITS

Edgar William Pulsford, Strand, London, England, assignor, by mesne assignments, to National Research Development Corporation, London, England, a corporation of Great Britain Application August 16, 1950, Serial No. 179,766

3 Claims. (Cl. 324—78)

This invention relates to pulse rate measuring circuits.

The pulse rate measuring circuit of the invention comprises a condenser connected to be alternately charged through one valve and discharged through another valve into a reservoir smoothing condenser provided with a leakage path at an incidence controlled by the pulses the rate of which is to be measured, this condenser and leak being connected in the input circuit of an amplifier having negative feedback to make the input impedance comprising the smoothing circuit approach zero. When equilibrium is established the mean smoothed direct current in the leakage path is equal to the mean current of the discharges of the first mentioned condenser, which may be termed the feed condenser, and the voltage difference between the ends of the leakage path provides a measurement of the mean current of the discharges of the feed condenser and hence of the number of discharges per unit of time; the measurement of the voltage difference between the ends of the leakage path is performed by the negative feedback amplifier in which it is connected: the reservoir smoothing condenser and its leakage path, in addition to performing a smoothing function on the input current pulses, determine the interval over which the average of the current is found.

The circuit of the invention may be adapted to measure different ranges of input pulse rates or to integrate over any of a series of intervals by switching means arranged to change the effective values of the condensers. According to a subsidiary feature of the invention, condensers to be selectively switched into the circuit as smoothing condenser are maintained charged to the same voltage, that is to say, the stand-by condensers are kept at the voltage of the effective smoothing condenser, so that sudden voltage changes in switching are substantially avoided.

The circuit is effective to sum, over a chosen period, voltage pulses or voltage steps applied to charge the feed condenser.

It is advantageous, especially for pulses of high repetition frequency, to apply the initial pulses to a divide-by-two circuit to develop a pulse train of which the leading edges (or steps of one sense) coincide with one set of alternate initial pulses and the trailing edges (or steps of opposite sense) coincide with the other set of alternate initial pulses.

Accordingly, in another aspect the invention resides in a pulse rate measuring circuit comprising a constant amplitude square wave generating circuit having two stable states connected to be excited by an initial pulse train to develop a sharply stepped wave, the successive steps of which coincide with successive pulses of the initial pulse train, and a switch circuit having a condenser connected to be charged through one valve by the voltage steps of like sense, and to be discharged into a smoothing condenser through another valve, the smoothing condenser having a leakage path the current in which is measured by measurement of the voltage difference between the ends of it.

A rate meter embodying the invention will now be described with reference to the single figure of the accompanying drawing which is a schematic diagram of my invention.

The particular embodiment about to be described is designed to count positive going pulses of between 5 and 10 volts amplitude applied to an input terminal IN. These input pulses are shaped and phase inverted in a class B, resistance coupled, pentode amplifier stage PS consisting of a single pentode, with resistive anode load and with its grid biassed to the anode cut-off point. For each input pulse the amplifier stage PS is arranged to deliver negative-going pulses of about 50 volts amplitude through a condenser $C_1$ to the cathode of a double diode $V_1$. The cathode of $V_1$ is shown tied to the positive line voltage by a resistance $R_1$ and the anodes $A_1$ and $A_2$ are at the line voltage and well below the line voltage respectively and vice versa as will hereinafter be explained. Thus a negative pulse applied to condenser $C_1$ drives the cathode of $V_1$ negative and whichever of the anodes $A_1$ or $A_2$ which happens to be at line voltage will conduct. The arrangement is made more sensitive to 50 volt pulses by the provision of a resistance $R_{1a}$ between the cathode of $V_1$ and earth such that the cathode is held at about 25 volts below the positive line by the potential divider formed by $R_1$ and $R_{1a}$.

The double diode $V_1$ and a double triode $V_{2a}$, $V_{2b}$, together constitute an Eccles-Jordan scale-of-two circuit. This has two stable states—being a symmetrical circuit—and is triggered from one to the other by the incoming pulses. For one stable state suppose that $V_{2a}$ is conducting, in which case the anode potential is low because of the potential drop across $R_2$. The grid potential of $V_{2b}$ is derived from the anode potential of $V_{2a}$ by means of the resistive potential divider $R_4$, $R_7$, which is so proportioned that the grid potential of $V_{2b}$ is below cut-off. Because $V_{2b}$ is cut off, the grid bias of $V_{2a}$ is determined by the resistive potential divider formed of $R_3$, $R_5$, $R_6$, which is so proportioned that (having regard to the voltages of the positive and negative supply lines) the grid of $V_{2a}$ would be at about $+20$ v. with respect to the (common) earthed cathode, were it not for grid current which flows to such an extent that the grid is actually held at about cathode potential (because the grid-cathode resistance for grid positive is small compared to the resistance of the potential divider).

The stable state just described would also apply were $V_{2a}$ substituted for $V_{2b}$ and vice versa.

The application of a negative pulse of sufficient amplitude via $V_1$ causes the circuit to change from one of its stable states to the other, as is well known in the art.

Particular attention is directed to the potentials of the grids of $V_{2a}$ and $V_{2b}$, one of which is held at earth potential by grid current, the other being below cut off potential. On the arrival of a triggering pulse, these grid potentials are interchanged. The grids of $V_{2a}$, $V_{2b}$ are connected directly to those of $V_{3a}$, $V_{3b}$, a pair of triodes whose common cathodes are connected to the negative supply line via resistance $R_8$. Because the cathode potential of a triode connected in this way must be within a few volts (positive) of the grid voltage when the valve is conducting, and because the grid of the conducting member of the pair is held at earth potential, as described above, the common cathode potential must be a few volts above earth potential, and hence the current in $R_8$ is defined, both of its terminals being connected to stable voltage points. All the cathode current flows through one only of $V_{3a}$, $V_{3b}$, the other being cut-off by the negative grid bias supplied from the grid of the nonconducting member of the pair $V_{2a}$, $V_{2b}$. The defined cathode current flows through one of the anode loads, $R_9$, $R_{10}$, the voltage drop across which is the product of the current and the value of the resistance; if the latter is fixed, then this voltage drop is fixed. The anode voltage of the non-conducting member of $V_{3a}$, $V_{3b}$ is at the potential of the positive line, since no current flows through the anode load.

On the arrival of a train of pulses at the input they are switched by the valve $V_1$ alternately to valve $V_{2a}$ or $V_{2b}$ the anode potentials of which control the potentials of the diode anodes $A_1$ and $A_2$. Successive pulses cause the reversal of the stable states of $V_{2a}V_{2b}$ and consequently, because of the conditions just described, cause the current to be switched from $V_{3a}$ to $V_{3b}$, and vice versa. In the interval between pulses, there is no change in the path of the current in $V_{3a}V_{3b}$. Consequently, considering for example, the anode of $V_{3a}$, and supposing it to be initially at the $+$HT potential (the valve being cut-off) on the arrival of a pulse the anode potential falls by a defined amount, and remains there until the arrival of the next pulse and so on. The waveform at the anode of $V_{3a}$ consists of a rectangular waveform of defined amplitude, but whose "vertical sides" (as seen on a cathode-ray oscilloscope) are in synchronism with the incoming pulses.

For the purposes of the succeeding ratemeter part of the circuit, the waveform necessary for one cycle of its action consists of a positive going edge followed, after a short interval, by a negative going edge. Such a waveform could be generated from each incoming pulse by a triggered square wave generator, having a pulse duration fixed by circuit parameters and not by pulse repetition rate as in the above example. In such a case there is a chance that some pulses would go unrecorded because of their arrival during the generating time of the square wave (assuming random-in-time pulses). But with the circuit described this cannot happen, because each pulse causes but one edge of a rectangular waveform. Only one half as many rectangular waveforms are generated as there are input pulses, but this is corrected in the subsequent circuits by doubling the value of one of the two components which are associated in the generation of a voltage proportional to the count rate.

The ratemeter part of the circuit comprises a double diode $V_4$, a resistance-coupled pentode amplifier $V_5$ of high gain ($\sim$100 or more) and a triode $V_6$ connected as a cathode follower. A potential divider, $R_{12}R_{13}$ connected between the anode of $V_5$ and the negative supply line supplies the grid potential of the cathode follower $V_6$, whose cathode load $R_{14}R_{15}$ is also returned to the negative supply line. From a tapping on the cathode load (between $R_{14}R_{15}$) is connected a parallel resistance capacitance circuit $R_{16}C_{5a}$, the other terminal of which is connected to the grid of $V_5$. By adjustment of the variable part ($R_{14}$) of the cathode load of $V_6$ it is possible to find a condition where the grid bias applied to $V_5$ is the appropriate value to adjust the anode voltage of $V_5$ to the value required to adjust the grid voltage of $V_6$ to the value required to adjust the cathode voltage of $V_6$ to earth potential. V then reads zero, and $R_{14}$ is seen to have the function of a zero adjuster. In a practical case, the grid bias of $V_5$ is about 2 or 3 volts, negative to the earthed cathode, and $R_{14}$ is very small compared to $R_{15}$.

If now a source of voltage be introduced in series with the network connecting the grid of $V_5$ to the cathode load tapping of $V_6$ (disturbing the equilibrium of the circuit) the circuit of $V_5 V_6$ will settle down to a new state of equilibrium. The grid of $V_5$ and the cathode of $V_6$ both alter in potential until the potential difference between the grid of $V_5$ and the tapping point on the cathode load of $V_6$ is equal to the voltage of the source introduced between these points, but because $V_5$ constitutes an amplifier of considerable gain, the grid change is very much less than the cathode tap change, and if the stage gain is sufficiently high, the grid change may be neglected, and, the voltage change recorded on V is the same as that of the voltage source introduced into the circuit as described. It should be noted that no current flows in the grid-cathode tap circuit, because no grid current flows in $V_5$.

In the circuit as shown, the voltage source introduced is the potential difference between the terminals of the $R_{16}C_{5a}$ combination. This potential difference is set up by a current through the resistor, flowing from the cathode tap to the grid and onward via $V_{4b}$ (one half of $V_4$) to discharge a condenser $C_{4a}$ in the brief interval of time following a negative movement of the anode of $V_{3a}$.

The action of the double diode $V_4$ is to extract a fixed charge per pulse (actually per alternate pulse of the original train) from the capacitor $C_{5a}$. As explained above this results in an equilibrium current in $R_{16}$ (and hence an equilibrium potential difference across $R_{16}$) which bears a linear relation to the count rate. The output voltmeter is, therefore, deflected from its zero position an amount proportional to count rate.

As explained above the waveform at the anode of $V_{3a}$ consists of a series of rectangular waves whose sides are coincident with the incoming pulses, and whose amplitude is defined. On the positive movement of the anode waveform of $V_{3a}$, the right hand plate of $C_{4a}$ is held at earth potential by conduction of the diode $V_{4a}$. On the negative movement, first $V_{4a}$ is rendered non conducting because its anode is driven negative. After a negative increment of about 2 volts the diode $V_{4b}$ is rendered conducting and current flows into $C_{4a}$ to maintain its right hand plate at the grid potential of $V_5$. Since the extent of this negative swing is defined, the total charge transferred to $V_{4a}$ is also defined. Provided that $C_{5a}$ is much greater than $C_{4a}$, little or no pulse waveform appears at the grid of $V_5$. Furthermore, the potential change of the grid of $V_5$ is always negligible as explained above and constitutes in practice a fixed reference potential.

Considering the circuit of $V_5V_6$ starting from zero, on the extraction of charges as described first a potential difference builds up on $C_{5a}$. This goes on increasing until the current in $R_{16}$ results in a fall of potential across $C_{5a}$ at exactly the same rate as it is being built up; an equilibrium state is then reached.

In mathematical terms, the action of the circuit, in the equilibrium state, is given by $$e = (E - eg)\frac{n}{2} C_{4a} R_{16} \times \frac{R_{15}}{R_{14} + R_{15}}$$

where
$e$ is the reading of the output voltmeter
$E$ is the amplitude of the rectangular waves at the anode of $V_{3a}$
$eg$ is the value of negative bias on the grid of $V_5$
$R_{16}$ is the resistance of the leak resistor
$R_{14}R_{15}$ are the resistances in the cathode load of $V_6$
$C_{4a}$ is the capacitance of the capacitor so marked
$n$ is the count rate of the incoming pulses A typical set of practical values is:

$E = 50$ v. (adjusted for scale setting by variation of $R_9$)
$eg \cong 2$ v.
$R_{16} = 10 M\omega$ $\frac{R_{15}}{R_{14} + R_{15}} =$ is nearly unity $e$ ranges from 0 to 50 volts
$C_{4a}$ is determined with regard to the maximum value of $n$ which it is desired to read on V In the absence of any input pulses, the uncertainties of the zero reading of V are about $\pm 25$ millivolts because of changes of valve operating points with age, heater voltages, etc. which is only $\pm \frac{1}{2}$ part in 1000 of the full scale deflection. This is unreadable on an ordinary meter. The zero stability is, therefore, good.

The function of $C_{5a}$ is to smooth the pulsating currents through the $C_{5a}R_{16}$ combination into a relatively smooth direct current in $R_{16}$. It also has the effect of making the response of the instrument to changes of count rate exponential in character, with a time constant given by the product of $C_{5a}R_{16}$. The circuit shows how another capacitor $C_{5b}$ may be connected in parallel with $C_{5a}$ by moving a switch $S_2$ to the right to increase the "integrating time." This is of particular use in smoothing out the random fluctuating of the count rate of pulses derived from radioactive sources. In the left hand position in which the switch $S_2$ is shown the condenser $C_{5b}$ is not in use but is connected to the junction of resistances $R_{17}$ and $R_{18}$, the potential of which is adjusted to be equal to that of the grid of $V_5$ so that no change of potential occurs across the measuring resistance $R_{16}$ at the moment of connecting $C_{5b}$. The standby condenser has little effect on the integrating time when not in use, as the output of $V_6$ is of low impedance. A plurality of condensers $C_5$ may be employed to give a plurality of integrating times, a suitable multipoint switch being used to perform the function of $S_2$. Similarly a plurality of condensers $C_4$ may be employed to give a plurality of instrument ranges. They may be connected to either $R_9$ or $R_{10}$ and are preferably distributed between $R_9$ and $R_{10}$ to reduce stray capacity loading.

The component values in the circuits of $V_3$, $V_4$, $V_5$, $V_6$, are chosen so that full scale deflection of the output meter occurs for between 50 and 100 volts change at the cathode of $V_6$, so that the inevitable circuit-drifts due to ageing of valves, heater voltage changes due to unsteady mains voltages, component changes due to varying temperatures, and so on (which circuit-drifts usually amount to ±50 millivolts) are of minor importance in causing errors in the system.

Typical types and values for the components shown in the diagram are, by way of example only as follows:

*Circuit component list*

$V_1$ ---- British CV 140.
$V_2$ ---- British CV 858 or 6J6.
$V_3$ ---- British CV 858 or 6J6.
$V_4$ ---- British CV 140.
$V_5$ ---- British CV 432 or 6J7.
$V_6$ ---- British CV 858 or 6J6 both halves in parallel.

*Capacitors*

$C_1$ ---------- .001 µf.
$C_2$ ---------- 39 pf.
$C_3$ ---------- 39 pf.
$C_{4a}$ -------- 200 pf for full scale reading 1000 p. p. second.
$C_{4b}$ -------- 2000 pf. for full scale reading 100 p. p. second.
$C_{5a}C_{5b}$ ---- 0.1 to 8 µf. or more, depending on the desired smoothing of random fluctuations of count rate and/or the desired response time-constant of the output indications.

*Resistors*

$R_1$ ------- 27K.
$R_{2a}$ ------ 270K.
$R_2$ ------- 47K.
$R_3$ ------- 47K.
$R_4$ ------- 500K.
$R_5$ ------- 500K.
$R_6$ ------- 330K.
$R_7$ ------- 330K.
$R_8$ ------- 25K.
$R_9$ ------- 10 to 15K adjusted to set full scale deflection to a known pulse rate.
$R_{10}$ ------ 10 to 15K adjusted to set full scale deflection to a known pulse rate.
$R_{11}$ ------ 330K.
$R_{12}$ ------ 220K.
$R_{13}$ ------ 1 MΩ.
$R_{14}$ ------ 5K variable zero adjustment.
$R_{15}$ ------ 50K.
$R_{16}$ ------ 10MΩ.
$R_{17}$ ------ 10K variable (set to 3 to 5K as required).
$R_{18}$ ------ 100K.

Voltmeter 50 v. full scale deflection 1 m. a.

I claim:

1. A pulse rate measuring circuit comprising, means deriving constant amplitude voltage steps at a rate related to the input pulse rate, means applying the voltage steps to a first plate of a feed condenser having the second plate connected to an electrode of one polarity of a first diode and to an electrode of opposite polarity of a second diode, a reservoir condenser having a first plate connected to the other electrode of one of said diodes, a resistance in shunt with said reservoir condenser to form a rate circuit, a high gain negative feed back D. C. amplifier having an input grid forming a substantially fixed reference point of potential, means connecting the first plate of said reservoir condenser to said input grid, means connecting the remaining diode electrode to a further substantially fixed reference point of potential having a low impedance to earth, means connecting the second plate of said reservoir condenser to the output of said amplifier, and voltage measuring means connected across the output of said amplifier.

2. A pulse rate measuring circuit according to claim 1, wherein said means for deriving voltage steps constant in amplitude comprises a constant amplitude square wave generating circuit having two stable states, being changed from one stable state to the other by successive input pulses.

3. A pulse rate measuring circuit according to claim 1, having a second reservoir condenser, switch means for connecting said second condenser in parallel with the first mentioned reservoir condenser, and switch means associated with a fixed potential point for maintaining said second condenser charged to the potential of first mentioned condenser when not connected in parallel therewith.

References Cited in the file of this patent

UNITED STATES PATENTS

| | | |
|---|---|---|
| 2,113,011 | White | Apr. 5, 1938 |
| 2,307,316 | Wolff | Jan. 5, 1943 |
| 2,403,557 | Sanders | July 9, 1946 |
| 2,487,191 | Smith | Nov. 8, 1949 |
| 2,513,668 | Parker | July 4, 1950 |
| 2,540,524 | Houghton | Feb. 6, 1951 |
| 2,573,150 | Lacy | Oct. 30, 1951 |
| 2,580,083 | Doba, Jr. et al. | Dec. 25, 1951 |